Figure 1:
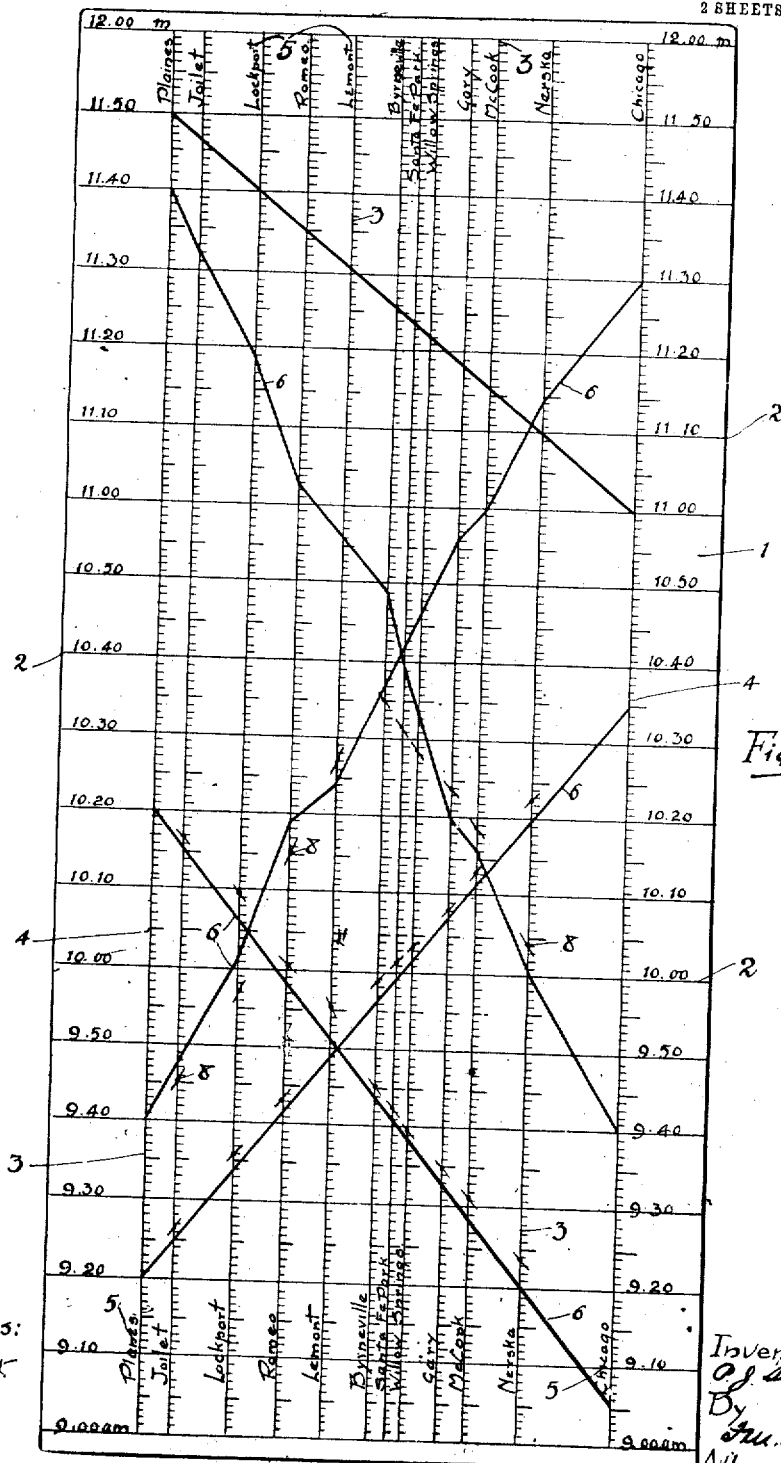

P. J. SIMMEN.
TRAIN DESPATCHER'S CHART.
APPLICATION FILED FEB. 18, 1907.

940,079.

Patented Nov. 16, 1909.

2 SHEETS—SHEET 1.

Witnesses:
Geoffrey Holt
E. Cohn

Inventor,
P. J. Simmen,
By
Attorney

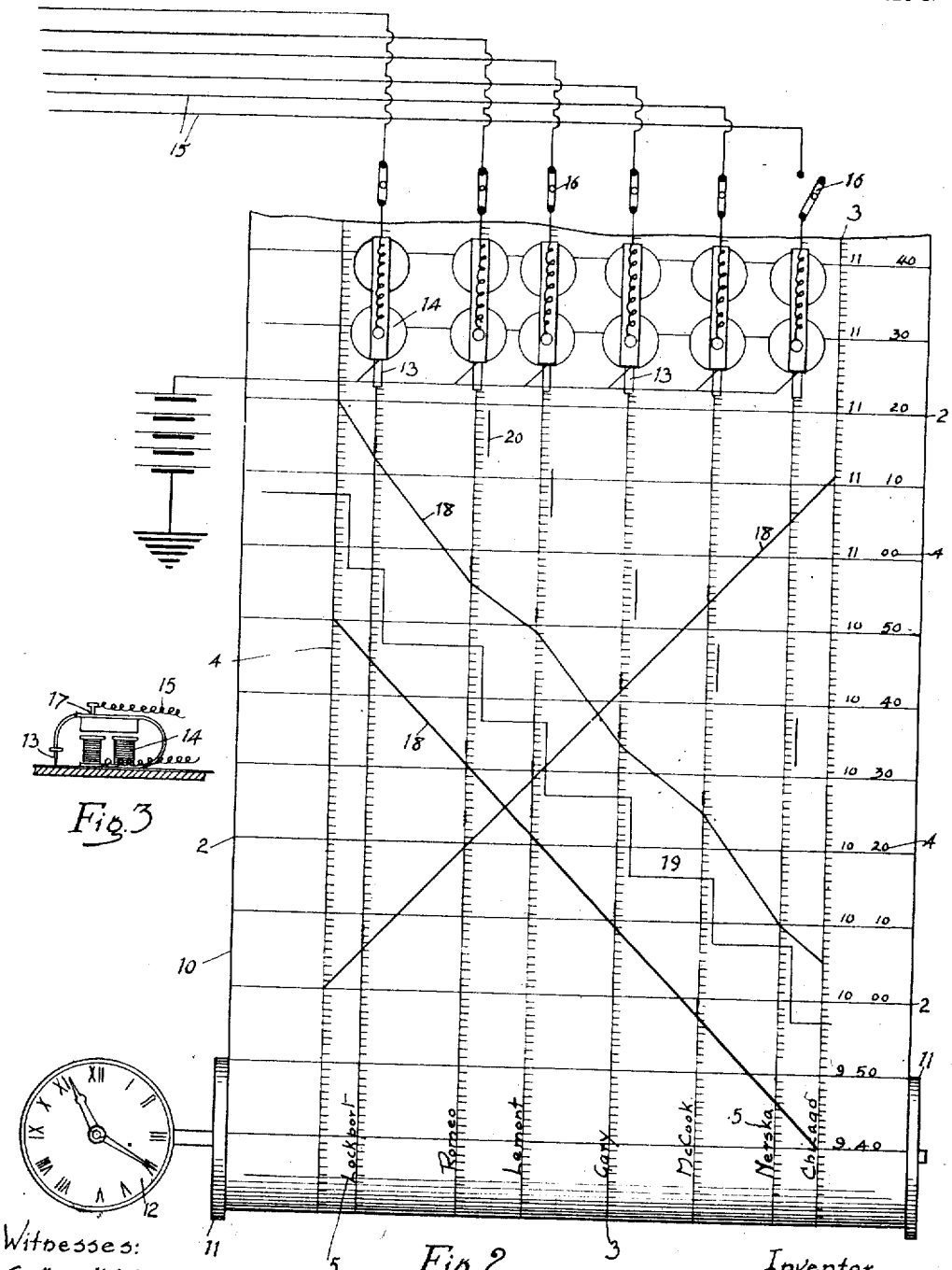

# UNITED STATES PATENT OFFICE.

PAUL J. SIMMEN, OF OAKLAND, CALIFORNIA.

TRAIN-DESPATCHER'S CHART.

940,079.

Specification of Letters Patent.   Patented Nov. 16, 1909.

Application filed February 18, 1907. Serial No. 358,151.

*To all whom it may concern:*

Be it known that I, PAUL J. SIMMEN, a citizen of the United States, residing at Oakland, in the county of Alameda and State of California, have invented new and useful Improvements in Train-Despatchers' Charts, of which the following is a specification.

The object of the present invention is to provide a chart by means of which a train despatcher can, by recording the times of arrival of the several trains at the several stations, apprehend more easily the relative positions of the trains, and which will also serve as a daily record of the movement of the trains over the despatcher's division.

In the accompanying drawing, Figure 1 is a front view of my improved chart; Fig. 2 is a front view partly diagrammatic showing the chart, automatically marked from the distant stations; Fig. 3 is a detail side view of the marking device.

Referring to the drawing, 1 indicates a sheet or chart, of suitable width for the size of the despatcher's division and may be of any length according to the time for which it is to be used. Said chart is ruled with horizontal lines 2, spaced at regular intervals to indicate distances of time, and with vertical lines 3, spaced at regular intervals to indicate the irregular distances between the signaling stations from which signals or reports are sent to the despatcher. While I shall hereafter speak of the time lines as being horizontal and the space lines as vertical, it is to be understood that these terms are merely relative, and that the chart can be equally well used with the time lines vertical and the space lines horizontal, the arrangement in this respect being merely according to the preference of the despatcher. The time lines 2 are marked with the hours and minutes, as shown at 4, and the smaller subdivisions indicate the exact time to the minute. The extent of this subdivision may be increased or diminished as may be desired. The vertical lines are marked with the names of different stations, as shown at 5. The unequal distances between the lines, corresponding to the irregular distances between the stations may be either unmodified or modified distances. By unmodified distances is meant, that the distances between the lines are in exact proportion with the distances in miles between the stations. But it is generally the case that the distances between the stations are not in exact proportion to the running times of the train between those stations, on account of, for instance, the greater amount of curvature in one part of the line, or the more numerous or steeper grades therein, or for other reasons. By "modified distances" is meant therefore, that these factors are taken into account and that the distances between the vertical lines represent the normal running times between the several stations. Upon the chart are also printed or otherwise formed lines 6 which represent the schedule time of the several trains, in either direction, over the division controlled by the despatcher. Thus, the lowest line 6 will indicate the schedule time of a train leaving Chicago at 9.05 a. m., passing through Nerska at 9.20, through McCook at 9.28, and so on. This line being straight, the chart may be supposed to be prepared with the vertical lines spaced for the "modified distances," as above explained. If said vertical lines were spaced for the unmodified distances, said schedule line would deviate from a straight line between stations where the running times are not exactly proportionate to actual distances. But either of these methods of spacing may be adopted. The second schedule line from right to left upward indicates the schedule time of a freight train of which the running times between stations, even if modified, would not be in the same proportion as those of a passenger train, by reason of the fact that the circumstances modifying the running times of the latter would not modify those of the former in the same degree. Obviously the schedule lines extending from right to left upward are for trains traveling in one direction upon the division, and those from left to right upward for trains traveling in the other direction.

To use the chart, the despatcher records the passage of a train through a signaling station on the chart by means of a suitable mark 8 thereon, which by its distance along the time line for that station from the point where the train's schedule line crosses said time line, indicates the extent to which the train is behind or ahead of time. This mark may be in the form of a short line substantially parallel with the schedule line, or, if desired, these marks may be connected to form a continuous line. The despatcher by following the line of marks thus made can readily see the progress of the several trains on his division and can send suitable messages to the trainmen. The chart may be used for either a single or double track railroad, since the schedule lines for trains going in opposite directions, will themselves slope in opposite direction and cannot become confused.

In the modification shown in Fig. 2 there is employed a movable chart 10, wound on a roller 11, and advanced by clock work 12. For each station on the line from which a report is sent of the passage of trains, there is provided a marking device 13 operated by magnets 14, energized by currents in a wire 15, leading to said station, these marking devices being arranged to mark the chart at, or adjacent to, the lines which correspond to the several stations. These magnets may be so energized either by operator at the respective stations, or automatically by the passage of the trains, a system for obtaining this result being shown in the United States Patent granted to me July 3rd, 1906 No. 824,887. However, the manner in which these marking devices are severally actuated from the distant stations forms no part of the present invention. The devices are controlled by switches 16. In order to avoid friction on the chart by the operation of the marking devices, which would tend to retard the movement of the clock work, I preferably provide a make and break circuit 17 for the marking device, so that it punctures or otherwise marks the paper in a line of points, this arrangement being comparatively frictionless as compared with the marking by a pencil or the like device moved along the paper. The friction of a considerable number of the latter devices upon the chart is by no means negligible. In general the markings on this chart differ from those made by hand, as shown in Fig. 1, in that these markings are parallel with the direction of the movement of the paper, and therefore at right angles to the lines which indicate the passage of time. Such a direction of the markings is therefore characteristic of a chart automatically marked from distant stations, as distinguished from one marked by hand by the despatcher as he receives the reports. The markings made by the devices 13 may be to one side of the station lines, instead of over them, as shown. The train schedule lines may be printed or marked on the chart in several different ways. Thus, as shown at 18, they may be straight, or approximately oblique lines. Or, as shown at 19, they may be zigzag lines, having parts horizontal and parts vertical, the vertical parts corresponding to the lines of points which record on the chart the actual movement of the train when running on exact time. Or, as shown at 20, the schedule markings may be a series of vertical lines only, said vertical lines, as in the line 19, corresponding to the markings by the marking devices. In all cases the train schedule markings follow a general oblique direction. The several styles of schedule marking are shown on the same sheet only for the purpose of illustration, and in practice only one of these styles would in general be used on a chart.

While in the chart shown the station lines are parallel, it is obvious that the principle of this invention could be applied to disk charts, in which case the station lines would be circular and concentric, and the time lines radial, or vice versa.

The charts thus marked can be preserved and serve as official records of the movements of the trains.

By the word "proportionately" in the claims is meant that the signal station lines are spaced at distances apart proportionate to the distances, either absolute or relative, of the several signal stations on the line, being relatively proportionate, when the inequalities causing variations in the running time are taken into account. By the words "train schedule lines", and words of like import, when used in a claim, is meant lines which indicate the intended running times of the train, which are determined when the time table is made up.

I claim:—

1. A train despatcher's chart having parallel time lines, and distinguishing marks therefor, and parallel spaced signal station lines transverse to the time lines, at different distances from each other, such distances being proportionate to the running distances between the stations, and distinguishing marks therefor, substantially as described.

2. A train despatcher's chart having parallel time lines, and distinguishing marks therefor, and parallel signal station lines transverse to the time lines, and distinguishing marks therefor, and train schedule lines, substantially as described.

3. A train despatcher's chart having uniformly spaced time lines and distinguishing marks therefor, and spaced signal station lines crossing the time lines at a uniform angle, and at different distances from each other, such distances being proportionate to the running distances between the stations, and distinguishing marks therefor, substantially as described.

4. A train despatcher's chart having uniformly spaced time lines and distinguishing marks therefor, and spaced signal station lines crossing at the time lines at a uniform angle and at different distances from each other, such distances being proportionate to the running distances between the stations, and distinguishing marks therefor, and a train schedule marking extending in a general oblique direction relative to the time and station lines, substantially as described.

5. A train despatcher's chart having parallel time lines and distinguishing marks therefor, and parallel spaced signal station lines transverse to the time lines at different distances from each other, such distances being proportionate to the running distances between the stations, and distinguishing marks therefor, in combination with train controlled marking devices operating on said chart at points generally corresponding to said signal station lines, and located in a series extending across the chart in the direction of the time lines.

In testimony whereof I have hereunto set my hand in the presence of two subscribing witnesses.

PAUL J. SIMMEN.

Witnesses:
FRANCIS M. WRIGHT,
L. SCHMALE.